US006210646B1

(12) United States Patent
Larson et al.

(10) Patent No.: US 6,210,646 B1
(45) Date of Patent: Apr. 3, 2001

(54) PERMANGANATE FEEDER FOR IRON FILTER

(75) Inventors: Ralph H. Larson, Bayport; John L. Schlafer, Woodbury, both of MN (US)

(73) Assignee: Ecowater Systems, Inc., Woodbury, MN (US)

( * ) Notice: Subject to any disclaimer, the term of this patent is extended or adjusted under 35 U.S.C. 154(b) by 0 days.

(21) Appl. No.: 09/150,085

(22) Filed: Sep. 9, 1998

Related U.S. Application Data

(63) Continuation-in-part of application No. 08/606,183, filed on Feb. 23, 1996, now abandoned.

(51) Int. Cl.[7] .......... B01D 11/02

(52) U.S. Cl. .......... 422/261; 422/275; 422/283; 137/268

(58) Field of Search .......... 422/261, 275, 422/277, 279, 283, 276; 137/268

(56) References Cited

U.S. PATENT DOCUMENTS

| | | |
|---|---|---|
| 203,981 | 5/1878 | Adamson et al. . |
| 409,234 | 8/1889 | Quinn . |
| 452,764 | 5/1891 | Salathe . |
| 939,131 | 11/1909 | Hensel . |
| 1,978,536 | 10/1934 | Jeavons et al. . |
| 2,072,976 | 3/1937 | Andrus . |
| 3,167,506 | 1/1965 | Fackler et al. . |
| 3,502,442 | 3/1970 | Campbell et al. . |
| 3,753,495 | 8/1973 | Bjork . |
| 3,766,940 | 10/1973 | Mason . |
| 3,772,193 | 11/1973 | Nelli et al. . |
| 3,841,349 | 10/1974 | Todd . |
| 3,864,090 | 2/1975 | Richards . |
| 3,969,605 | 7/1976 | Danell . |
| 4,026,673 | 5/1977 | Russo . |
| 4,059,522 | 11/1977 | Polley et al. . |
| 4,250,910 | 2/1981 | King . |
| 4,286,573 | 9/1981 | Nickel . |
| 4,303,515 | 12/1981 | Rademacher . |
| 4,385,034 | 5/1983 | Gacer . |
| 4,407,322 * | 10/1983 | Moore et al. .......... 422/276 X |
| 4,419,233 | 12/1983 | Baker . |
| 4,579,142 | 4/1986 | Jung-Chao . |
| 4,582,099 | 4/1986 | McDaniel et al. . |
| 4,655,247 | 4/1987 | Westra et al. . |
| 4,687,019 | 8/1987 | Mayfield . |
| 4,735,782 | 4/1988 | Wicker et al. . |
| 4,825,897 | 5/1989 | Shade . |
| 4,832,075 | 5/1989 | Dubach . |
| 5,080,805 | 1/1992 | Houser . |
| 5,103,914 | 4/1992 | LaHaye . |
| 5,137,049 | 8/1992 | Orlowski . |
| 5,147,530 | 9/1992 | Chandler et al. . |
| 5,169,406 | 12/1992 | Tewari . |
| 5,176,836 | 1/1993 | Sauer et al. . |
| 5,178,181 | 1/1993 | Craig . |
| 5,404,594 | 4/1995 | Ring et al. . |
| 5,427,748 | 6/1995 | Wiedrich et al. . |
| 5,536,479 | 7/1996 | Miller et al. . |
| 5,666,987 | 9/1997 | Combs . |

OTHER PUBLICATIONS

North Star Water Conditioning, Installation and Operation Manual No. 7148396 entitled "Automatic Iron filter, Model NSSIF–SW with Solid State Control," Oct., 1994, 35 pages.

Tech Sheet—Sears Automatic Iron Filter, No. 7118391, Feb., 1992, 11 pages.

Tech Sheet—Clack Corporation, Potassium Permanganate Feeder, Dec., 1992, 2 pages.

* cited by examiner

*Primary Examiner*—Terrence R. Till
*Assistant Examiner*—Theresa T. Snider
(74) *Attorney, Agent, or Firm*—Piper Marbury Rudnick & Wolfe

(57) ABSTRACT

A potassium permanganate feeder has an inlet container and an outlet container disposed in an outer container. An inlet tube disposed in the inlet container supplies fill water which flows out of the inlet container through a porous screen to dissolve potassium potassium crystals. The resulting potassium permanganate solution flows into the outlet container through a porous screen where it may be withdrawn through an outlet tube disposed therein.

25 Claims, 3 Drawing Sheets

PERMANGANATE FEEDER FOR IRON FILTER

This is a continuation-in-part of Ser. No. 08/606,183, filed on Feb. 23, 1996, which is incorporated herein by reference, now abandoned.

BACKGROUND OF THE INVENTION

1. Field of the Invention

The present invention relates to the art of water treatment systems. More particularly, the present invention is directed to an apparatus for dissolving potassium permanganate ($KMnO_4$) crystals in water to produce a uniform saturated potassium permanganate solution and for dispensing the solution to regenerate manganese oxide based iron removal water treatment systems.

2. Description of Related Art

Iron dissolved in water used for residential and commercial purposes can cause problems which make its removal desirable. For example, water with a high iron content can cause rust stains on clothing and plumbing fixtures and can make food and beverages taste unpleasant.

One commonly used method for removing iron from water involves flowing a stream of the water through a mineral bed containing "manganese greensand," a material consisting of small pebble-like particles coated with manganese oxide ($MnO_2$). The manganese greensand oxidizes the dissolved iron, thereby allowing the iron to precipitate in a solid form which can be filtered out. However, this oxidation process gradually exhausts the water treatment capability of the manganese greensand, so that its ability to remove iron from water becomes degraded. When this occurs, the manganese greensand may be regenerated by exposing it to a solution containing an appropriate oxidizer most commonly potassium permanganate, which process restores its iron removal capability. Typically, the regeneration process is performed automatically at periodic intervals to prevent the mineral bed from ever becoming completely exhausted.

Typically, a feeder provides the potassium permanganate solution needed for regeneration. A number of different feeder designs are known. Generally, a quantity of potassium permanganate crystals sufficient to supply many regenerations is placed in the feeder. Water is added to the feeder to dissolve a portion of the potassium permanganate crystals, and the feeder is able to dispense the resulting solution to the iron removal system.

For the manganese greensand to be fully regenerated by the regeneration process, it must be exposed to a solution having a sufficient amount of potassium permanganate present therein. This, in turn, means that the feeder must dissolve this sufficient amount of potassium permanganate and dispense the solution to the iron removal system. One way to ensure that a sufficient amount of potassium permanganate is provided for regeneration is to add a known amount of water to the feeder containing potassium permanganate crystals, so that potassium permanganate solution having a known saturation is formed, and then to dispense all of this solution for regeneration.

However, it is difficult to form a saturated potassium permanganate solution, and it is especially difficult to achieve a uniform level of saturation with each regeneration as the amount of potassium permanganate crystals present in the feeder decreases. Specifically, in many feeder designs the level of saturation decreases as the amount of potassium permanganate crystals decreases.

One way of achieving a more uniform saturation is to wait a long period of time after adding the water to the feeder before dispensing the solution. However, with many iron removal systems this is not possible because the automatic regeneration process applies suction to the feeder to withdraw solution almost immediately after the water is added to the feeder. With such a short amount of time to dissolve the potassium permanganate, it is particularly difficult to provide a uniform saturated solution.

The handling of potassium permanganate also presents a number of additional difficulties. Potassium permanganate is very reactive and, over time, tends to corrode or degrade many common materials. It also stains skin, clothing, and other materials and is damaging to the environment. Accordingly, it is crucial that any leakage or spillage of potassium permanganate crystals or solution be minimized.

SUMMARY OF THE INVENTION

The principal object of the present invention is to provide a feeder which can dispense, as needed, the potassium permanganate solution required to regenerate manganese oxide based iron removal systems.

Another object of the present invention is to provide a feeder which is able to receive a quantity of water to dissolve potassium permanganate crystals and which is then able to dispense a sufficiently saturated potassium permanganate solution shortly after this quantity of water has been added.

Yet another object of the present invention is to provide a feeder which is able to dispense repeatedly a potassium permanganate solution having a level of saturation which remains uniform even though the amount of solid potassium permanganate present in the feeder decreases with each regeneration.

Still another object of the present invention is to provide a potassium permanganate feeder which works reliably over a long period of time.

An additional object of the present invention is to provide a potassium permanganate feeder which minimizes the spillage or leakage of potassium permanganate solution.

In accordance with the present invention, a potassium permanganate feeder is provided which is able to dispense a uniform saturated potassium permanganate solution for the regeneration of manganese oxide based iron removal systems. An inlet and outlet container are disposed in an outer container, and inlet and outlet tubes are disposed in the inlet and outlet containers, respectively. A common tube is connected at one end to the iron removal system and is connected at the other end to the inlet and outlet tubes of the feeder. An inlet check valve allows fluid to pass through the inlet tube only in the direction toward the inlet container, and an outlet check valve allows fluid to pass through the outlet tube only in the direction away from the outlet container. Potassium permanganate crystals are placed in the outer container in the space between the inlet and outlet containers. The inlet and outlet containers each include a porous barrier in the form of a screen which allows water and solution to pass through but which substantially excludes the passage of the potassium permanganate crystals.

When regeneration is required, the iron removal system introduces a quantity of water to the common tube which the check valves direct to the inlet tube. An automatic shut-off valve, such as a float valve, prevents overfilling. The water flows into the inlet container and through the screen to dissolve a portion of the potassium permanganate crystals to form a saturated potassium permanganate solution which then flows into the outlet container. After the quantity of water has been introduced into the feeder, the iron removal system provides a suction on the common tube which closes the check valve in the inlet tube and opens the check valve in the outlet tube. As a result, saturated potassium permanganate solution is drawn into the outlet tube to supply the iron removal system through the common tube.

DESCRIPTION OF THE PREFERRED EMBODIMENT

Figure 1:
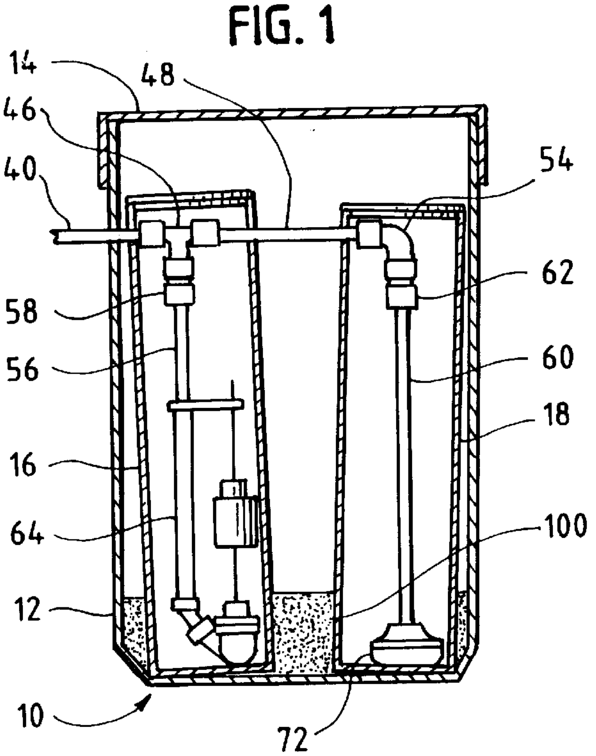
FIG. 1 is a schematic representation of the potassium permanganate feeder in accordance with the present invention.
Figure 3:
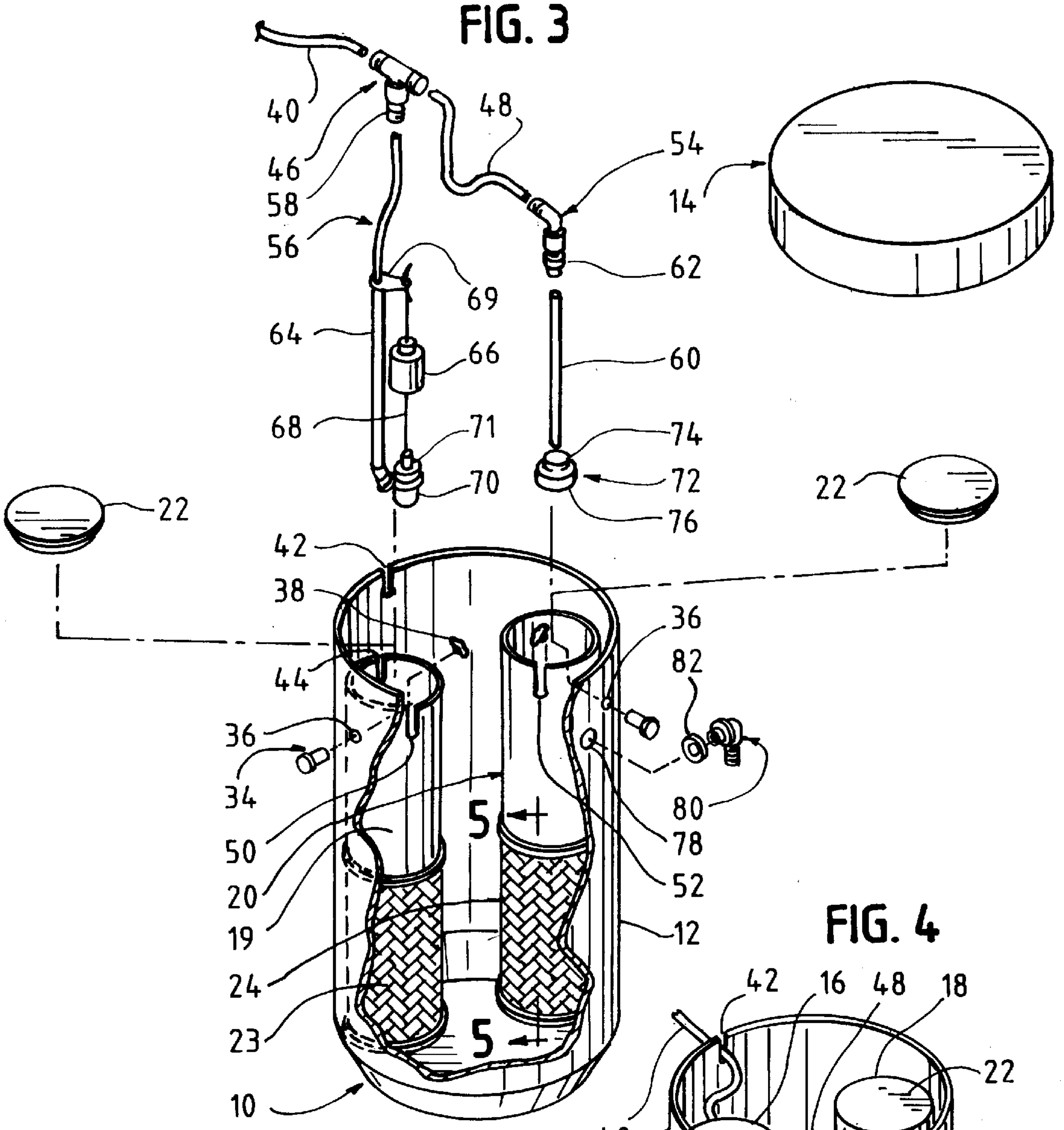
FIG. 3 is a partially cut away and partially exploded view of the potassium permanganate feeder of FIG. 1 in accordance with the present invention.
Figure 4:
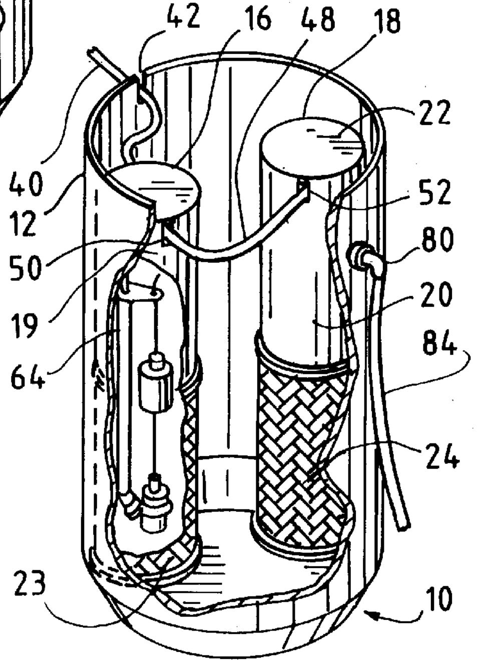
FIG. 4 is a partially cut away view of the potassium permanganate feeder of FIG. 1 in accordance with the present invention with the cover removed.

With reference to FIGS. 1, 3, and 4, the potassium permanganate feeder in accordance with the present invention comprises an outer container 12, which preferably includes a cover 14, and in which are disposed an inlet container 16 and an outlet container 18. Inlet container 16 comprises an upper cylindrical portion 19 and a cylindrical screen assembly 23 which depends therefrom. Outlet container 18 comprises an upper cylindrical portion 20 and a cylindrical screen assembly 24 and is preferably of identical construction to inlet container 16. Upper cylindrical portions 19 and 20 are preferably made out of a structural material which does not react with potassium permanganate, such as polyvinyl chloride. Upper cylindrical portions 19 and 20 are preferably each fitted with a cover 22.

Figure 5:
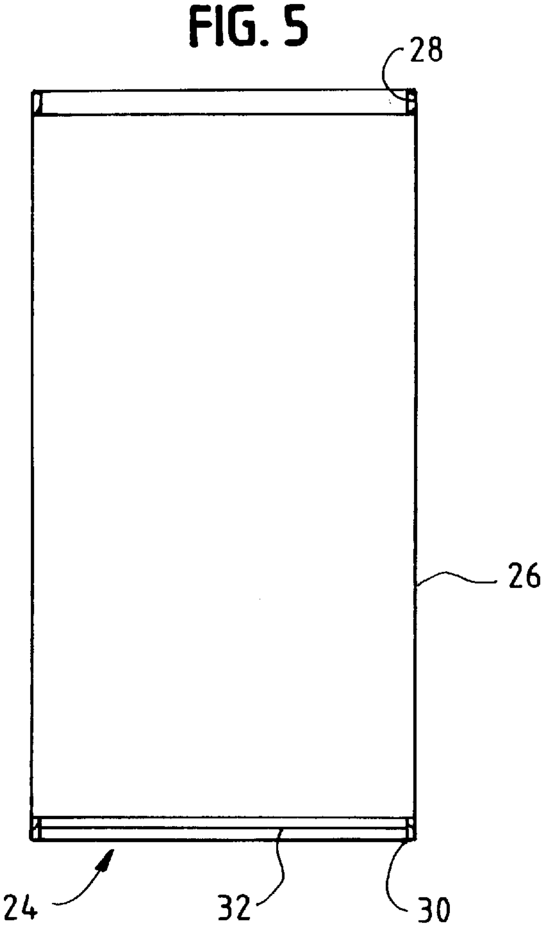
FIG. 5 is a cross-sectional view of the screen assembly of the potassium permanganate feeder in accordance with the present invention shown in FIG. 3 taken along line 5—5.

With reference to FIG. 5, screen assembly 24 comprises a cylindrical screen 26 which is fitted with atop seal 28 and a bottom seal 30. Fitted in bottom seal 30 is a circular screen 32. Top seal 28 is fitted over upper cylindrical portion 20 to join screen assembly 24 thereto.

Screens 26 and 32 have a mesh size small enough to prevent most of the potassium permanganate crystals from passing through but large enough to allow water and potassium permanganate solution to pass through. Mesh sizes in the range of 100×100 to 200×200 are found to be preferable, and a mesh size of 100×100 is most preferable. Screens 26 and 32 are preferably made out of a 300 series stainless steel, which has been found to be highly resistant to corrosion potassium permanganate. Top seal 28 and bottom seal 30 are preferably made out of an elastomeric material which is not degraded by potassium permanganate, such as a silicone rubber or a fluoroelastomer rubber.

Inlet container 16 and outlet container 18 are each supported in feeder 10 by attaching upper portion 20 to outer container 12 by means of a bolt 34 and a wing nut 38. Bolt 34 passes through a mounting hole 36 in outer container 12 and a corresponding mounting hole (not shown) in upper portion 19 or 20. In this way, inlet container 16 and outlet container 18 are advantageously supported at the top by bolt 34, rather than at the bottom by screen assembly 24 which, because of the fine mesh size of screen 26, may have very little strength.

With reference to FIGS. 1, 3, and 4, feeder 10 is provided with a common tube 40 which extends from the outside of outer container 12 to the inside through a notch 42. Common tube 40 further extends to the inside of inlet container 16 through a notch 44 in upper portion 20 to tee connector 46. An intermediate tube 48 extends from tee connector 46 through a notch 50 and further extends into outlet container 18 through a notch 52 to an elbow connector 54.

An inlet tube 56 is connected to tee connector 46 via an inlet check valve 58, and an outlet tube 60 is connected to elbow connector 54 via an outlet check valve 62. Inlet tube 56 is connected to a float valve 64, which includes a float 66 mounted on a stem 68 slidably connected to a guide 69 and a main valve body 70 having an outlet port 71. Outlet port 71 is in fluid communication with inlet tube 56. Float 66 floats on the surface of water, so that float 66, and stem 68 attached thereto move up or down as the water level moves up or down. Stem 68 extends into main valve body 70 through outlet port 71. As stem 68 moves up or down with the water level, outlet port 71 is closed opened, respectively. In particular, when the fluid level increases to a predetermined level, outlet port 71 of float valve 64 closes up.

Outlet tube 60 ends in a filter assembly 72, which includes a flared connector 74 and a filter screen 76. Filter screen 76 has a mesh size which is preferably coarser than the mesh size used in screen 24, such as 50×50 mesh. Filter screen 76 is preferably made out of a 300 series stainless steel and is preferably much wider than the diameter of outlet tube 60. Preferably, filter assembly 72 is placed near the bottom of outlet container 18.

With reference to FIGS. 3 and 4, outer container 12 has an overflow outlet hole 78 below the level of mounting holes 36 and notch 42. A hose adapter 80 is sealed to overflow outlet hole 78 via a grommet 82. A hose 84 may be attached to hose adapter 80 and may be directed to a drain (not shown).

Figure 6:
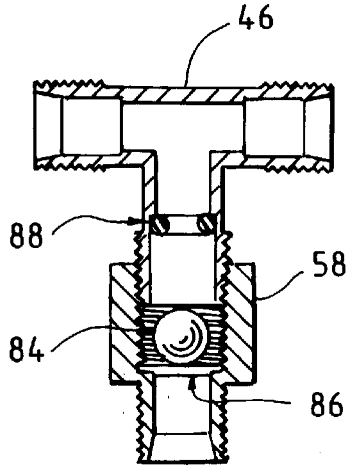
FIG. 6 is a sectional view of the tee connector and inlet check valve of FIG. 1 in accordance with the present invention.

As shown in FIG. 6, inlet check valve 58 is preferably connected directly to tee connector 46 and operates by means of a ball 84 entrained between a screen 86 and an O-ring 88. Ball 84 is made out of a material which floats on water, such as hollow polypropylene. When either a vacuum is applied to inlet check valve 58 from above or the water level below is high enough, ball 84 is urged against O-ring 88, thereby closing inlet check valve 58. However, when water pressure is applied to inlet check valve 58 from above, ball 84 is pushed away from O-ring 88, thereby opening inlet check valve 58.

Figure 7:
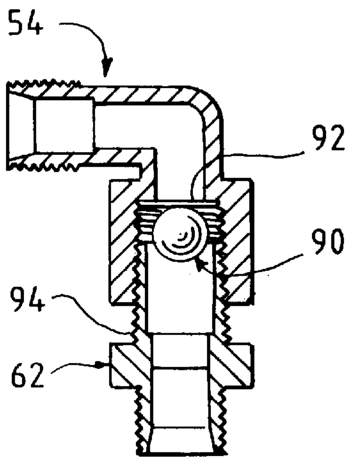
FIG. 7 is a sectional view of the elbow connector and outlet check valve of FIG. 1 in accordance with the present invention.

As shown in FIG. 7, outlet check valve 62 is preferably connected directly to elbow connector 54 and operates by means of a ball 90 entrained between a screen 92 and a neck 94. Ball 90 is made out of a resilient material, such as rubber, which sinks in water. When water pressure is applied to outlet check valve 62, ball 90 is urged against neck 94, thereby closing outlet check valve 62. Even when no pressure is applied from above, outlet check valve 62 is closed because gravity holds ball 90 against neck 94. However, when even a slight vacuum is applied to outlet check 62 from above, ball 90 is pulled off neck 94, thereby opening outlet check valve 62.

Figure 2:
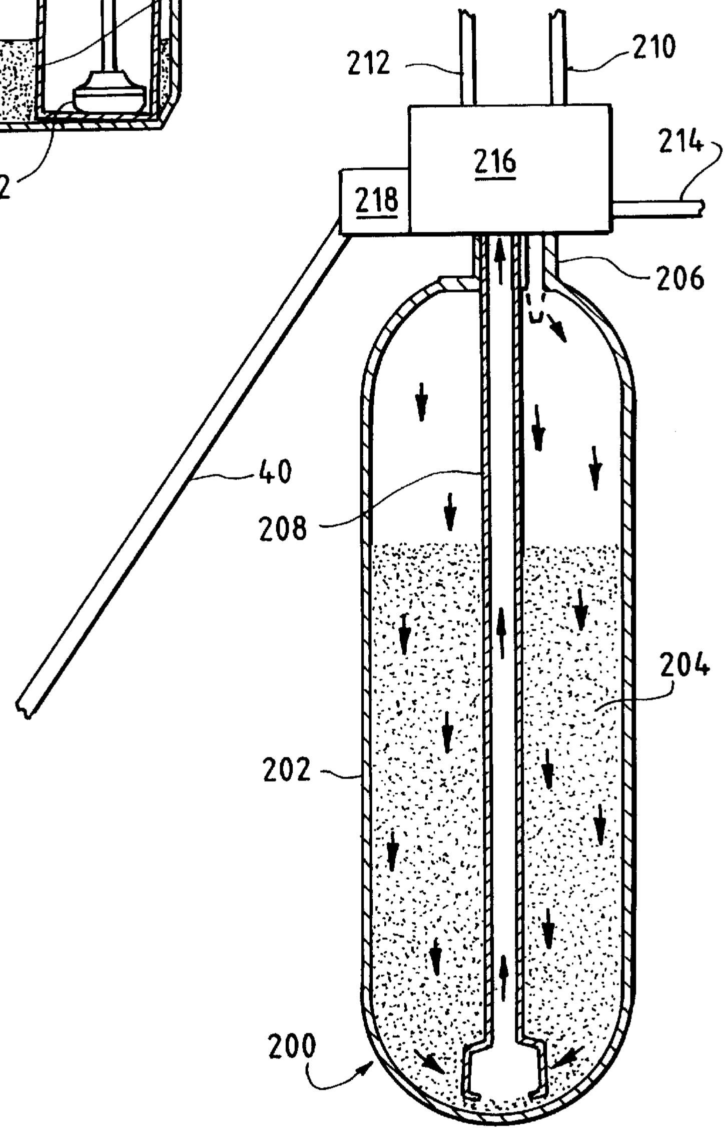
FIG. 2 is a schematic representation of an iron removal system which would be used with the potassium permanganate feeder of FIG. 1.

With reference to FIG. 2, a representative iron removal system 200 which may be used with potassium permanganate feeder 10 is shown schematically. Iron removal system 200 includes a tank 202 which holds a filter bed 204 of a material such as manganese greensand. Tank 202 includes a pipe 206 from which fluid may be introduced at the top of filter bed 204 and a central pipe 208 which extends to near the bottom of filter bed 204. Iron removal system 200 is provided with a source pipe 210 which is connected to a source of raw or unfiltered water (not shown), a destination pipe 212 which is connected to a destination for the treated water (not shown), and a drain pipe 214 which is connected to a drain (not shown). Common tube 40 connects iron removal system 200 to feeder 10.

A top tank 202 is a rotary valve 216 which has a nozzle and venturi system 218. Rotary valve 216 is connected to pipes 206, 208, 210, and 212 and to common tube 40 via nozzle and venturi system 218 and is able to interconnected these fluid pathways in various ways described hereafter.

When iron removal system 200 is in service treating water, rotary valve 216 is configured to direct raw water from source pipe 210 to pipe 206 so that it flows through mineral bed 204 for iron removal. The treated water is then directed up central pipe 208 to destination pipe 212.

When regeneration of filter bed 204 is required, iron removal system 200 undergoes several steps, including a fill step in which water is sent to feeder 10 and a solution draw step, following immediately thereafter, in which potassium permanganate solution is withdrawn from feeder 10. In the fill step, rotary valve 216 is configured so that iron removal system 200 continues to treat water as when it is in service, except that some of the treated water from central pipe 208 is directed to common tube 40 so that it enters feeder 10. In the solution draw step, rotary valve 216 is configured so that part of the raw water from source pipe 210 is sent directly to destination pipe 212 and part of it is directed through nozzle and venturi system 218. This passage of water through nozzle and venturi system 218 creates a suction on common tube 40 so that potassium permanganate solution is withdrawn from feeder 10. The potassium permanganate solution enters nozzle and venturi system 218, where it is mixed with the flow of raw water there to become a more dilute solution. Typically, the potassium permanganate solution is roughly half as saturated after it flows through nozzle and venturi system 218. From nozzle and venturi system 218, the solution is directed to central pipe 208. The solution flows downwardly through central pipe 208, exits at the bottom of central pipe 208, and then flows upwardly through mineral bed 204. In this way, mineral bed 204 is exposed to potassium permanganate solution to regenerate it. After flowing through mineral bed 204 to regenerate it, the solution enters pipe 206 where it is directed to drain pipe 214 for removal.

To prepare feeder 10 for use, a quantity of potassium permanganate crystals 100 is placed in outer container 12 between inlet container 16 and outlet container 18, as shown in FIG. 1. As described above, the process of regenerating iron removal system 200 begins with the fill step, whereby iron removal system 200 supplies fill water to feeder 10 via common tube 40. From common tube 40, the fill water travels through tee connector 46 and then through intermediate tube 48 to elbow connector 54. The pressure of the fill water opens inlet check valve 58 and closes outlet check valve 62. With inlet check valve 58 open, the fill water travels down through inlet tube 56 and exits from outlet port 71 to fill inlet container 16. The fill water from inlet container 16 slowly passes through screen assembly 23 to reach the quantity of potassium permanganate crystals 100. The fill water dissolves a portion of the quantity of potassium permanganate crystals 100 to form a potassium permanganate solution, and the solution passes through screen assembly 24 to fill outlet container 18.

During the solution draw step, which immediately follows the fill step, iron removal system 200 applies a vacuum to common tube 40, which is communicated to inlet check valve 58 and outlet check valve 62. The vacuum closes inlet check valve 58 and opens outlet check valve 62, as described above. With outlet check valve 62 open, the vacuum draws up solution from outlet container 18 into outlet tube 60 via filter assembly 72. From outlet tube 60, the solution is drawn into iron removal system 200 through common tube 40. Filter screen 76 of filter assembly 72 serves to prevent large particles which may damage iron removal system 200 from being drawn up into outlet tube 60.

Screen assembly 23 on the inlet container 16 and screen assembly 24 on the outlet container 18 serve two important functions in the present invention. First, screen assemblies 23 and 24 isolate potassium permanganate crystals 100 from the locations where fill water is introduced into feeder 10 and where the solution is withdrawn from feeder 10, so that the crystals will not cause blockages and will not be withdrawn from feeder 10 into iron removal system 200. Second, screen assemblies 23 and 24 serve to distribute the flow of water uniformly over a large surface area. As a result, the flow of water through potassium permanganate crystals 100 is widely and uniformly distributed, and the dissolution of the crystals is enhanced. It has been found that the resulting potassium permanganate solution which collects in outlet container 18 is highly saturated. Moreover, it has been found that the saturation level of the potassium permanganate solution formed in feeder 10 remains relatively uniform, even after the amount of potassium permanganate crystals has been greatly reduced after successive regenerations.

Feeder 10 is also provided with several safety features in order to minimize leakage or spillage of potassium permanganate solution. If the level of water or solution in outer container 12 becomes too high, the excess will exit through outlet hole 78 and may be directed to a drain (not shown) by hose 84. Although such drainage prevents spillage or leakage of potassium permanganate solution, it is undesirable because of the adverse environmental effects of potassium permanganate solution. To prevent overfilling of feeder 10 from occurring in the first place, float valve 64 automatically shuts off the flow of water into inlet container 16 when the fluid level has reached a predetermined level. Preferably, this predetermined fluid level is set at a level below that of outlet hole 78. Although the use of float valve 64 is particularly convenient, other types of automatic shut-off valves could be used.

The above described embodiments are merely illustrative of the features and advantages of the present invention. Other arrangements and advantages may be devised by those skilled in the art without departing from the spirit and scope of the present invention. Accordingly, the invention should not be deemed to be limited to the above detailed description but only by the claims that follow.

We claim:

1. An apparatus for dissolving a solid chemical to form a solution and for dispensing the solution, comprising:

an outer container;

an inlet container disposed in said outer container, wherein at least a portion of said inlet container is porous so that said inlet container is in fluid communication with said outer container;

an inlet tube in fluid communication with said inlet container;

an outlet tube in fluid communication with said outer container;

an inlet check valve in fluid communication with said inlet tube, so that fluid is able to flow through said inlet check valve only in the direction toward said inlet container; and an outlet check valve in fluid communication with said outlet tube, so that fluid is able to flow through said outlet check valve only in the direction away from said outer container, whereby once a solid chemical has been placed in said outer container, water can enter said apparatus through said inlet tube to dissolve the solid chemical and to form a solution, and, thereafter, the solution can be withdrawn from said apparatus through said outlet tube.

2. The apparatus of claim 1, further comprising a common tube in fluid communication with both said inlet tube and said outlet tube, so that water entering said apparatus flows first through said common tube and then through said inlet tube, and solution withdrawn from said apparatus flows first through said outlet tube and then through said common tube.

3. The apparatus of claim 1, further comprising an overflow outlet in said outer container.

4. The apparatus of claim 1, further comprising means for automatically shutting off fluid flow into said inlet container.

5. The apparatus of claim 1, further comprising an outlet container disposed in said outer container, wherein at least a portion of said outlet container is porous so that said outlet container is in fluid communication with said outer container, and wherein said outlet tube is disposed in said outlet container.

6. The apparatus of claim 1, wherein said porous portion of said inlet container includes a screen.

7. The apparatus of claim 5, wherein said porous portion of said outlet container includes a screen.

8. The apparatus of claim 1 or 5, further comprising an outlet tube screen connected to said outlet tube and in fluid communication with said outlet tube.

9. An apparatus for dissolving a solid chemical to form a solution and for dispensing the solution, comprising:

an outer container;

a porous inlet container disposed in said outer container defining an inlet volume;

a porous outlet container disposed in said outer container defining an outlet volume;

an inlet tube in fluid communication with said inlet volume;

an outlet tube in fluid communication with said outlet volume; and a common tube in fluid communication with said inlet tube and with said outlet tube, whereby once a solid chemical has been placed in said outer container between said porous inlet container and said porous outlet container, water can enter said inlet volume through said inlet tube, via said common tube and flow through said porous inlet container to dissolve the solid chemical and to form a solution which enters said outlet volume through said porous outlet container, and, thereafter, the solution can be withdrawn from said outlet volume through said common tube, via said outlet tube.

10. The apparatus of claim 9, further comprising an inlet check valve in fluid communication with said inlet tube, so that fluid is able to flow through said inlet check valve only in the direction toward said inlet volume.

11. The apparatus of claim 9, further comprising an outlet check valve in fluid communication with said outlet tube, so that fluid is able to flow through said outlet check valve only in the direction away from said outer volume.

12. The apparatus of claim 9, further comprising an overflow outlet in said outer container.

13. The apparatus of claim 9, further comprising means for automatically shutting off fluid flow into said inlet volume.

14. The apparatus of claim 9, wherein said porous inlet container includes a screen.

15. The apparatus of claim 9, wherein said porous outlet container includes a screen.

16. The apparatus of claim 9, further comprising an outlet screen in fluid communication with said outlet tube.

17. An apparatus for dissolving a solid chemical to form a solution and for dispensing the solution, comprising:

an outer container;

a first porous barrier disposed in said outer container defining an inlet volume;

a second porous barrier disposed in said outer container defining an outlet volume;

an inlet tube in fluid communication with said inlet volume;

an outlet tube in fluid communication with said outlet volume; and an automatic shut-off valve in fluid communication with said inlet tube, whereby once a solid chemical has been placed in said outer container between said first porous barrier and said second porous barrier, water can enter said inlet volume through said inlet tube and flow through said first porous barrier to dissolve the solid chemical and to form a solution which enters said outlet volume through said second porous barrier, and, thereafter, the solution can be withdrawn from said outlet volume through said outlet tube.

18. The apparatus of claim 17, further comprising a common tube in fluid communication with both said inlet tube and said outlet tube, so that water entering said apparatus flows first through said common tube and then through said inlet tube, and solution withdrawn from said apparatus flows first through said outlet tube and then through said common tube.

19. The apparatus of claim 17, further comprising an inlet check valve in fluid communication with said inlet tube, so that fluid is able to flow through said inlet check valve only in the direction toward said inlet volume.

20. The apparatus of claim 17, further comprising an outlet check valve in fluid communication with said outlet tube, so that fluid is able to flow through said outlet check valve only in the direction away from said outer volume.

21. The apparatus of claim 17, further comprising an overflow outlet in said outer container.

22. The apparatus of claim 17, wherein said first porous barrier includes a screen.

23. The apparatus of claim 17, wherein said porous barrier includes a second screen.

24. The apparatus of claim 17, further comprising an outer tube screen in fluid communication with said outlet tube.

25. The apparatus of claim 17, wherein said automatic shut-off valve includes a float valve.

* * * * *

UNITED STATES PATENT AND TRADEMARK OFFICE

CERTIFICATE OF CORRECTION

PATENT NO. : 6,210,646 B1
DATED : April 3, 2001
INVENTOR(S) : Ralph H. Larson and John L. Schlafer It is certified that error appears in the above-identified patent and that said Letters Patent is hereby corrected as shown below:

Claim 24,
Line 1, change "outer" to -- outlet --

Signed and Sealed this

Twelfth Day of March, 2002

*Attest:*

JAMES E. ROGAN
*Director of the United States Patent and Trademark Office*

*Attesting Officer*